June 4, 1940. T. KOVACS 2,203,160
MAGAZINE PENCIL OF THE TYPE COMPRISING A LEAD-CONVEYING TUBE
Filed Dec. 19, 1938

Inventor:
THEODOR KOVACS
By Richards & Geier
Attorneys.

Patented June 4, 1940

2,203,160

UNITED STATES PATENT OFFICE 2,203,160

MAGAZINE PENCIL OF THE TYPE COMPRISING A LEAD-CONVEYING TUBE

Theodor Kovács, Vienna, Germany, assignor to Firma Guenther Wagner, Hanover, Germany, a corporation of Germany Application December 19, 1938, Serial No. 246,684 In Germany December 20, 1937

10 Claims. (Cl. 120—17)

This invention relates to magazine pencils of the type comprising a lead-conveying tube, into which the leads are automatically delivered from a magazine, and which is pressed forward by hand against the action of a spring to impart a step-by-step feed to the lead, a feed chuck at the forward end of the conveying tube and a sleeve which co-operates with the feed chuck to cause the chuck to grip the lead during the forward stroke, and a guide chuck which holds the lead in the point part of the pencil.

The known pencils of this kind are very complicated; the two chucks are actuated by separate return springs and this circumstance necessitates the employment of milled parts which engage the one within the other. Furthermore for constructional reasons the two chucks are separated by a considerable distance which results in frequent jamming of the lead. Since it is not possible to unscrew the point part when the guide chuck is blocked without damaging the latter, it is very difficult to put right any trouble.

In accordance with the present invention, the feeding chuck and the guide chuck are coupled together and are retracted by means of a common return spring. This arrangement enables the construction to be very simple and the use of milled parts engaging one within the other is obviated. The feeding chuck is situated as near as possible to the guide chuck but nevertheless it is still farther away from the point of the pencil than in magazine pencils which have no guide chuck. In order to prevent a lead, which follows upon a short piece of lead and has not been gripped by the guide chuck, from being drawn back by the closed feeding chuck each time the magazine is depressed, in accordance also with the invention, there is arranged at the inner end of the guide chuck a clamping device which grips the following lead directly it enters the bore leading to the guide chuck. As already mentioned, in magazine pencils having a guide chuck in the point, the point part cannot be screwed off when the guide chuck contains a lead. In order to prevent loading being obstructed by small pieces of lead and in order that any trouble may be rectified, the point part is provided, in accordance with a further feature of the invention, with a wide hole passing transversely through the pencil.

The lower part of a magazine pencil constructed in accordance with the invention is illustrated by way of example in the accompanying drawing, in which, Fig. 1 is a longitudinal section on an enlarged scale.

Figure 1:
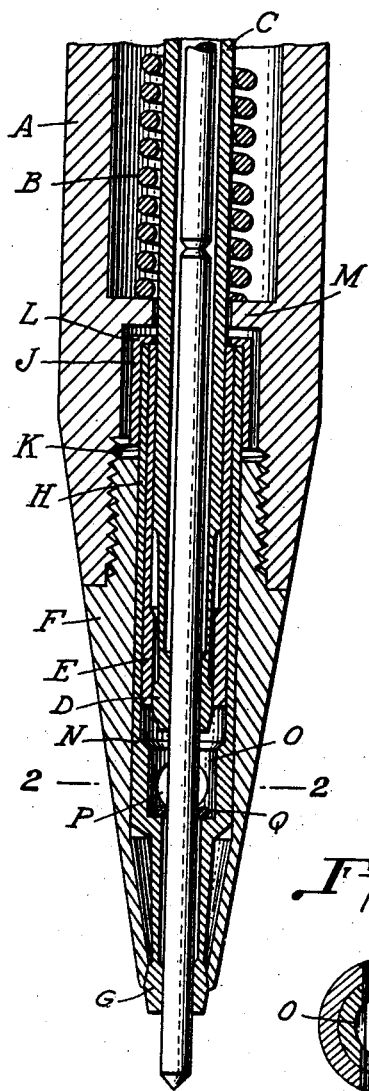

Referring to the drawing, A is the lower part of the stem, in the bore of which are accommodated the magazine for the leads which is not illustrated and the return spring B. The lead conveying tube C terminates in a feeding chuck D which opens by spring action. E is a clamping sleeve. F is the point part of the pencil, and G is the guide chuck which closes resiliently in known manner. The conicity of the external clamping surface of the guide chuck is more obtuse than that of the external clamping surface of the feeding chuck, so that the guide chuck cannot wedge itself in the correspondingly shaped bore of the point part as firmly as the feeding chuck can wedge itself in the bore of the clamping sleeve. The guide chuck G is continued upwardly in the form of the tubular extension H, which is displaceable in the bore of the point part and carries at its upper end, which projects beyond the point part, a cap J which is pressed on. The lower edge K of the cap J forms a forward stop for the tubular extension H and thus limits the forward movement of the guide chuck. The base L of the cap is provided with an aperture which allows the lead conveying tube C and the feeding chuck to pass but does not allow the clamping sleeve E to pass through. The stem A is provided with a shoulder M of which one side acts as abutment for the return spring and the other limits the upward movement of the cap J and thus also of the guide chuck G. The clamping sleeve E is slidably mounted in the tubular extension H. Its forward movement is limited by the inwardly projecting abutment N of the tubular extension and its backward movement by the base L of the cap J. The difference between the distance separating the two abutments L and N and the length of the clamping sleeve determines the feed of the lead at each stop. The bore of the tubular extension H is constricted below the abutment N and forms a chamber O. The internal diameter of this chamber is approximately only 0.3 mm. greater than the greatest external diameter of the head of the feeding chuck, when closed, so that the jaws of the feeding chuck cannot open too widely. At the bottom of the chamber directly at the upper end of the bore of the guide chuck there are fitted in transverse bores in the tubular extension H, two resilient rods Q, Q, the distance between which is somewhat less than the thickness of the lead, so that the lead which is between the rods is gently gripped by them. The point part F and the tubular extension H, which is secured against rotation therein, are provided with a transverse hole P which passes through the chamber O.

Figure 3:
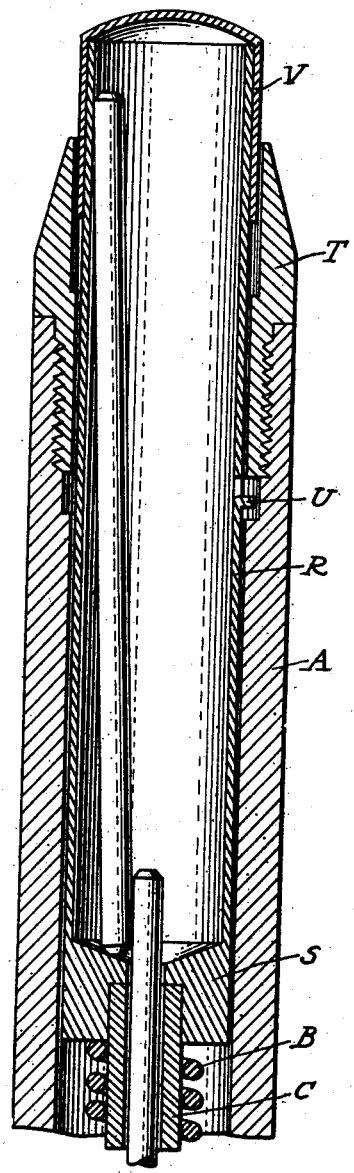
Fig. 3 is a longitudinal section through the upper part of the magazine pencil.
Figure 2:
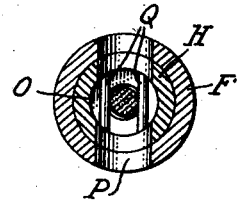
Fig. 2 is a cross-section on the line 2—2 of Fig. 1.

Figure 3 is a longitudinal section through the upper part of the magazine pencil. In the bore of the stem A is located the magazine R into the bottom S of which the lead-conveying tube to C is pressed. The magazine is provided with a flap U which is bent out of its wall and abuts against the lower face of the sleeve T which is screwed into the stem when there is no lead in the chuck D. By this means the magazine is prevented from springing out when the chuck is empty. The reference V represents the closure cap.

In order to assemble the pencil the return spring and the magazine together with the lead-conveying tube and the feeding chuck are introduced from above into the wide bore of the stem and secured in known manner against springing out when the chuck is empty. The tubular extension, the guide chuck and clamping sleeve are then inserted in the point part and the latter is screwed into the stem.

When the lower part of the lead-conveying tube C is empty and the filled magazine is depressed, a lead falls down the tube C until it is arrested by the resilient rods Q, Q. When the pressure on the magazine is released, the tube C is drawn upwards by the spring B carrying with it the sleeve E and subsequently the tubular extension H by means of the cap J. This upward movement is continued until the cap J bears against the stop M, whereupon the pressure of the spring wedges the sleeve E on the chuck D and causes it to grip the lead. On repeatedly depressing the magazine the chuck G with the steeper clamping cone opens first and the lead which is gripped by the chuck D is then pushed into the chuck G. When this has occurred, however, the upward movement of the tubular extension H is limited owing to the jaws of the chuck G being wedged against the lead, as shown in Fig. 1, and the cap J then limits the upward movement of the sleeve E and therefore also of the chuck D which becomes wedged in this sleeve. Further, when a lead is gripped in the chuck G, the friction between the lead and the chuck G causes the chuck G and the extension H to move downwards and the chuck to open immediately the magazine is depressed and before the sleeve E meets the abutment N.

Leads which follow upon short lengths of lead are slightly retracted each time by the receding feeding chuck unless they are seized underneath the feeding chuck. The lead clamping device provided at the upper end of the guide chuck prevents this retraction of the lead and thus avoids delays in feeding forward short lengths of lead. The clamping device at the upper end of the guide chuck may of course also be constructed in a different manner. The construction illustrated has, however, the advantage that the lead clamping device cannot become choked or blocked.

Short lengths of lead which might cause obstruction usually fall out through the transverse holes P. The chamber O is accessible by way of the transverse hole and, if necessary, small lengths of lead can be hooked out without unscrewing the point.

I claim:

1. A magazine pencil comprising a barrel, a lead-conveying tube, into which the leads are automatically delivered from a magazine, which tube is mounted in the barrel and can be pressed forward by hand against the action of a return spring to impart a step-by-step feed to the lead, a feed chuck at the forward end of the lead-conveying tube, a guide chuck at the pointed end of the barrel, a sleeve which co-operates with the feed chuck to cause the chuck to grip the lead during the forward stroke and means whereby said feed chuck and said guide chuck are coupled together by said sleeve so as to be retractable in common by said return spring.

2. A magazine pencil comprising a barrel, a lead-conveying tube, into which the leads are automatically delivered from a magazine, which tube is mounted in the barrel and can be pressed forward by hand against the action of a return spring to impart a step-by-step feed to the lead, a feed chuck at the forward end of the lead-conveying tube, a guide chuck at the pointed end of the barrel, a sleeve which co-operates with the feed chuck to cause the chuck to grip the lead during the forward stroke and means whereby said feed chuck and said guide chuck are coupled by said sleeve so as to move together in both directions during part of the forward and backward strokes of said conveying-tube.

3. A magazine pencil comprising a barrel, a lead-conveying tube which is mounted in the barrel and can be pressed forwards by hand against the action of a spring to impart a step-by-step feed to the lead, a magazine from which the leads are automatically delivered to said conveying tube, a feed chuck at the forward end of said tube, a guide chuck in the pointed end of said barrel, an extension on said guide chuck surrounding said feed chuck and part of said tube, and a movable sleeve interposed between said feed chuck and said guide chuck extension whereby said feed chuck and guide chuck extension are coupled together.

4. A magazine pencil comprising a barrel, a lead-conveying tube which is mounted in the barrel, a spring in said barrel and engaging said tube whereby said tube can be pressed forwards by hand against the action of said spring to impart a step-by-step feed to the lead, a magazine from which the leads are automatically delivered to the conveying tube, a feed chuck at the forward end of said tube, a guide chuck in the pointed end of said barrel, an extension on said guide chuck surrounding said feed chuck and a part of said tube, a movable sleeve interposed between said feed chuck and said guide chuck extension, whereby said feed chuck and said guide chuck extension are coupled together, stops by which the axial movement of said sleeve is limited, and a stop on said extension whereby its forward movement is limited.

5. A magazine pencil comprising a barrel, a lead-conveying tube which is mounted in the barrel, a spring in said barrel and engaging said tube, whereby said tube can be pressed forwards by hand against the action of said spring to impart a step-by-step feed to the lead, a magazine from which the leads are automatically delivered to said conveying tube, a feed chuck at the forward end of said tube, a guide chuck in the pointed end of said barrel, an extension on said guide chuck surrounding said feed chuck and part of said tube, a movable sleeve interposed between said feed chuck and said guide chuck extension, whereby said feed chuck and said guide chuck extension are coupled together, a cap having an aperture through which said conveying tube passes, said cap being fixed on the end of said extension and having an upper end face limiting the backward movement of the sleeve, and a lower edge limiting the forward movement of said tubular extension.

6. A magazine pencil comprising a barrel, a lead-conveying tube which is mounted in the barrel, a spring in said barrel and engaging said tube, whereby said tube can be pressed forwards by hand against the action of said spring to impart a step-by-step feed to the lead, a magazine from which the leads are automatically delivered to said conveying tube, a feed chuck at the forward end of said tube, a guide chuck in the pointed end of said barrel, an extension on said guide chuck surrounding said feed chuck and a part of said tube, a movable sleeve interposed between said feed chuck and said guide chuck extension, whereby said feed chuck and said guide chuck extensions are coupled together, a cap having an aperture through which said conveying tube passes and being fixed on the end of said extension, and a stop in said barrel by which the backward movement of said cap and tubular extension is limited when there is no lead in said guide chuck.

7. A magazine pencil comprising a barrel, a lead-conveying tube which is mounted in the barrel and can be pressed forwards by hand against the action of a spring to impart a step-by-step feed to the lead, a magazine from which the leads are automatically delivered to said conveying tube, a feed chuck at the forward end of said tube, a guide chuck in the pointed end of said barrel, an extension on said guide chuck surrounding said feed chuck and part of said conveying-tube, a sleeve interposed between said guide chuck and said extension whereby said guide chuck and feed extension are coupled together and a chamber in the pointed end of said barrel above the guide chuck the diameter of which is such that the said feed chuck can open only to a limited extent.

8. A magazine pencil comprising a barrel, a lead-conveying tube which is mounted in the barrel and can be pressed forwards by hand against the action of a spring to impart a step-by-step feed to the lead, a magazine from which the leads are automatically delivered to said conveying tube, a feed chuck at the forward end of said tube, a guide chuck in the pointed end of said barrel, an extension on said guide chuck surrounding said feed chuck and part of said conveying tube, a sleeve interposed between said guide chuck and said extension whereby said guide chuck and feed extension are coupled together, a chamber in the pointed end of said barrel, and transverse bores in said barrel through which the interior of said chamber is accessible.

9. A magazine pencil comprising a barrel, a lead-conveying tube which is mounted in the barrel and can be pressed forwards by hand against the action of a spring to impart a step-by-step feed to the lead, a magazine from which the leads are automatically delivered to said conveying tube, a feed chuck at the forward end of said tube, a guide chuck in the pointed end of said barrel, an extension on said guide chuck surrounding said feed chuck and part of said conveying tube, a sleeve interposed between said guide chuck and said extension whereby said guide chuck and feed extension are coupled together, a chamber in the pointed end of said barrel above said guide chuck, the diameter of which is such that said feed chuck can open only to a limited extent, and transverse bores in said barrel through which the interior of said chamber is accessible.

10. A magazine pencil comprising a barrel, a lead-conveying tube into which the leads are automatically delivered from a magazine, which tube is mounted in the barrel and can be pressed forward by hand against the action of a return spring to impart a step-by-step feed to the lead, a feed chuck at the forward end of the lead-conveying tube, a guide chuck at the pointed end of the barrel, a sleeve which cooperates with the feed chuck to cause the chuck to grip the lead during the forward stroke, means whereby said feed chuck and said guide chuck are coupled by said sleeve so as to move together and means for gripping the lead disposed in the pointed end of said barrel at the upper end of said guide chuck.

THEODOR KOVÁCS.